US010817830B1

(12) United States Patent
Dahlstrom et al.

(10) Patent No.: US 10,817,830 B1
(45) Date of Patent: Oct. 27, 2020

(54) SERVICE AND INVENTORY MANAGEMENT SYSTEM AND METHOD

(71) Applicant: Parts Town, LLC, Addison, IL (US)

(72) Inventors: Tom Dahlstrom, Plymouth, MN (US); David Womeldorf, Edina, MN (US); Michael Phelps, Eagan, MN (US)

(73) Assignee: Parts Town, LLC, Addison, IL (US)

( * ) Notice: Subject to any disclaimer, the term of this patent is extended or adjusted under 35 U.S.C. 154(b) by 743 days.

(21) Appl. No.: 14/613,274

(22) Filed: Feb. 3, 2015

Related U.S. Application Data

(60) Provisional application No. 61/935,523, filed on Feb. 4, 2014.

(51) Int. Cl.
*G06Q 10/08* (2012.01)

(52) U.S. Cl.
CPC .................................. *G06Q 10/087* (2013.01)

(58) Field of Classification Search
CPC ................................................... G06Q 10/087
See application file for complete search history.

(56) References Cited

U.S. PATENT DOCUMENTS

| | | | |
|---|---|---|---|
| 2013/0091040 A1* | 4/2013 | Fan ...................... | G06Q 10/087 705/28 |
| 2014/0236778 A1* | 8/2014 | Villardito ............. | G06Q 10/087 705/28 |

OTHER PUBLICATIONS

Ross, David. "Distribution Planning and Control" 1996. Chapman & Hall. Chapter 7, pp. 263-319.*

* cited by examiner

*Primary Examiner* — Florian M Zeender
*Assistant Examiner* — Christopher R Buchanan
(74) *Attorney, Agent, or Firm* — Foley & Lardner LLP

(57) ABSTRACT

An inventory system comprised of a central computing device in communication with one or more remote computing devices is disclosed. The central computing device is configured to update inventory information for inventory items held within the inventory system based on information received from the remote computing devices. The remote computing devices are configured to transmit updated inventory information to the central computing devices when an inventory item is newly added to the inventory system and when an inventory item is taken out of the inventory system. The remote computing devices also correspond to one or more inventory units for storing the inventory items. The remote computing devices are configured to transmit order requests to the central computing device that request additional inventory items for their corresponding inventory units.

16 Claims, 13 Drawing Sheets

FIGURE 12

SERVICE AND INVENTORY MANAGEMENT SYSTEM AND METHOD

PRIORITY STATEMENT

This application claims the benefit of U.S. Provisional Patent Application No. 61/935,523, filed Feb. 4, 2014, the entirety of which is hereby incorporated by reference herein.

TECHNICAL FIELD

The present invention relates to servicing and inventory management equipment, systems and methods. More particularly, the present invention relates to inventory management for dispersed inventory storage locations and mobile service units, such as vehicles.

BACKGROUND

Service operators service and repair equipment housed at customer locations. The equipment may be owned or leased by the customers. Service operators typically service customers in a geographic area surrounding a home base location out of which the service operator works. Service operators typically maintain an inventory of various equipment and parts needed to service and repair the customer equipment in order to provide quick service to those customers. Some of that inventory is typically stored on a service operator's vehicle, while some of the inventory may be stored in a storage facility at the home base location.

In certain industries, equipment downtime can cause significant financial losses. Accordingly, the ability to quickly service down equipment can be critical. The ability to provide prompt service depends on local service operators either having the necessary parts and equipment with them in a service vehicle during service calls, or being able to locate and obtain the necessary parts and equipment quickly.

However, in certain industries that require a wide range of repair parts and equipment, for example, the servicing of beverage dispensing or food service equipment, it may be impractical for a service operator to have all parts with them during service calls due to the number of different parts. Furthermore, the cost or size of certain parts or equipment may make it impractical for a service operator to maintain inventory of all potentially needed parts and equipment in each home base storage location or service vehicle. Additionally, some such parts or equipment are needed only infrequently. In certain industries, due to the range of parts and equipment needed for service calls and the cost of the parts and equipment, the value of the inventory in each service vehicle can exceed $50,000. Thus, there is a need for a system to minimize the cost of inventory of parts and equipment in service vehicles while minimizing the time to provide customer service or repair for customer equipment.

SUMMARY

The present application relates to a system and method for managing inventory of service items located in dispersed home base locations and mobile units across shared geographic zones. The present system provides for management of inventory levels of service parts and equipment in order to most effectively maintain an inventory of in-vehicle parts and equipment to provide prompt customer service. Furthermore, the present system identifies the location of the closest service or repair parts for such parts that are not stocked in the service repair vehicle. The present system also allows for certain inventory items, such as low-volume, high dollar or large sized items, to be shared across multiple geographic zones. The present system also provides an overall report regarding the locations of inventory of equipment and parts.

According to some embodiments, a central computing device for communicating with remote computing devices within an inventory system is disclosed. The central computing device may comprise: a database configured to store inventory information corresponding to inventory units within the inventory system; a memory configured to store a reorder criteria; a communication device configured to receive inventory update information from a remote computing device in response to a change in inventory items within the inventory system; and a processor in communication with the database, memory, and communication device. The processor may further be configured to: receive the inventory update information; update the inventory information based on the inventory update information; compare the inventory information and the reorder criteria; determine whether the inventory information satisfies the reorder criteria based on the comparison; and in response to determining the inventory information satisfies the reorder criteria, implement a reorder protocol.

According to some embodiments, a central computing device for communicating with remote computing devices within an inventory system is disclosed. The central computing device may comprise: a database configured to store inventory information corresponding to inventory units within the inventory system; a communication device configured to receive an inventory item request from a remote computing device, the inventory item request identifying a location of a requesting inventory unit and a request for a desired inventory item; and a processor in communication with the database and communication device. The processor may further be configured to: receive the inventory item request; determine a holding inventory unit within the inventory system holding the desired inventory item; generate an inventory unit list comprising the holding inventory unit and inventory information for the holding inventory unit; and control the communication device to transmit the inventory unit list to the remote computing device.

According to some embodiments, a computing device corresponding to a home inventory unit within an inventory system is disclosed. The computing device may comprise: a memory configured to store inventory information corresponding to the home inventory unit; an input device configured to receive an inventory request based on a user input, the inventory request identifying a desired inventory item; a communication device configured to transmit information to a central computing device and receive information from the central computing device; and a processor in communication with the memory, input device, and communication device. The processor may further be configured to: control the communication device to transmit the inventory request to the central computing device; and receive, via the communication device, an inventory unit list from the central computing device, the inventory list identifying a holding inventory unit holding the desired inventory item.

BRIEF DESCRIPTION OF THE DRAWINGS

FIG. 12 is an order overview display of the inventory management system.

DETAILED DESCRIPTION

Figure 1:
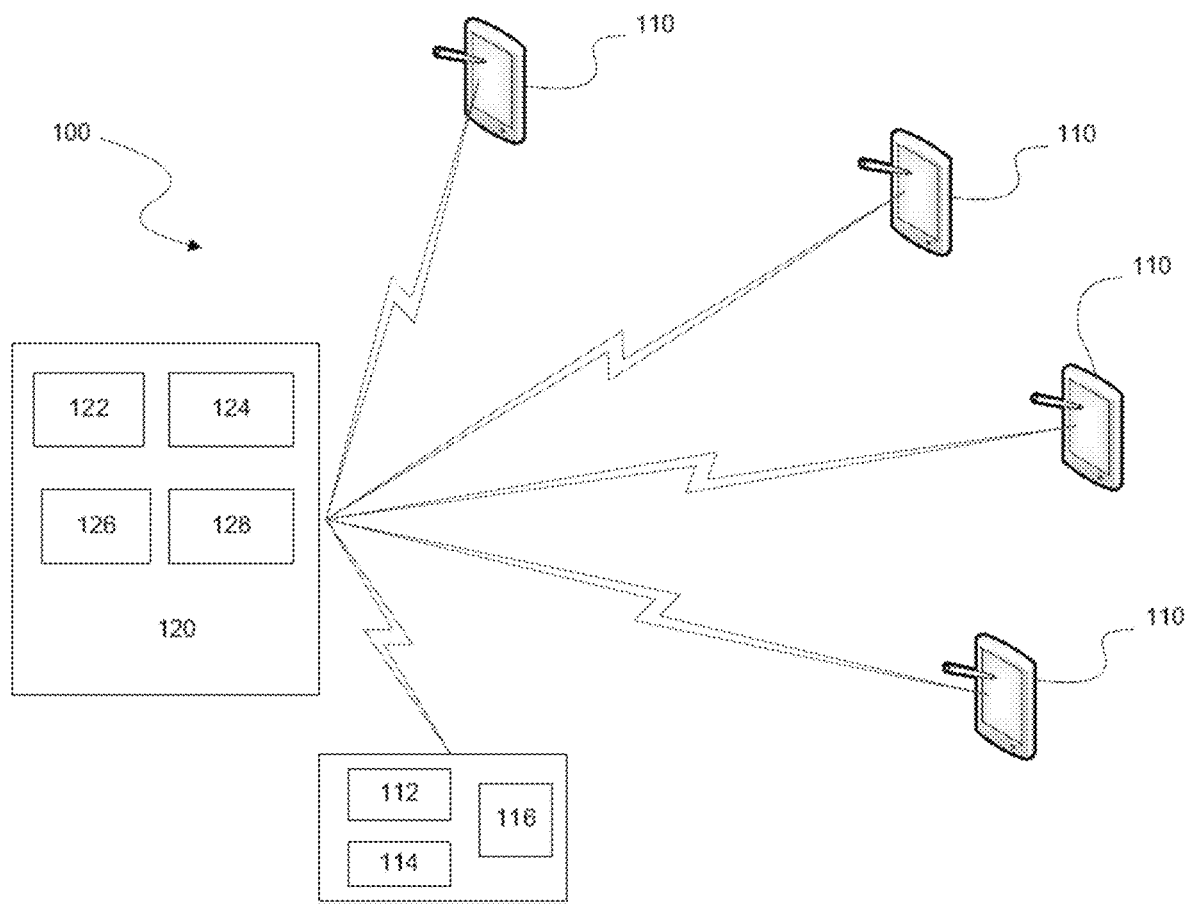
FIG. 1 is a schematic view of an embodiment of an inventory management system.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the instant disclosure is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the disclosure herein as would be understood by one of ordinary skill in the art.

The system 100 comprises a network of communicatively connected computer devices 110 at dispersed locations, which may be mobile or static. The computer devices 110 may be tablet computers, hand-held computers, mobile devices such as smart phones, portable computers, wearable mobile communication devices or the like. The computer devices 110 each have a processor 112, a communication device 114 and an input device 116. Suitable processors for such use are known to those of skill in the art. The communication device 114 may be a cellular telecommunications device operating over a cellular network, for example via CDMA, GSM, EV-DO, 3G and 4G protocol, LTE, a wi-fi communication device, a networked (hard wired) device, a satellite communication device or the like. The input device 116 may include a keyboard or touchscreen. The input device 116 may further include a bar-code reader, QR code reader, voice input, camera, optical scanner, including an optical character recognition device, or RFID reader, as are known in the art. The computer devices 110 are mobile devices. The computer devices 110 further comprise application software, through which the user can access an application and data stored on a central controller 120 described in detail below. The mobile computer devices 110 further have a location identifier, which is preferably a global positioning system (GPS) sensor, but in certain embodiments may be obtained using a wi-fi positioning system (WPS).

The system further includes a central controller 120 in communication either directly or indirectly with the connected computer devices 110 via the internet. The central controller 120 may be a computer or a server having a central memory 122, a central processor 124 and a central communication device 126 capable of sending and receiving data to and from the computer devices 110. The central memory 122 of central controller 120 can include any one or a combination of volatile memory elements (e.g., random access memory (RAM, such as DRAM, SRAM, SDRAM, etc.)) and nonvolatile memory elements (e.g., ROM, hard drive, CDROM, etc.) Numerous variations of the architecture of the central storage location would be obvious to one of skill in the art and are encompassed within the scope of the disclosure set forth herein. In certain embodiments, the central controller preferably comprises web server software as is known in the art. The central controller 120 receives communication from the connected computer devices 110, and also transmits information to the connected computer devices 110.

Steps and/or elements, and/or portions thereof described in the present disclosure may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system (O/S). Furthermore, the software embodied and described herein may be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, Ada, Net VB, C# or HTML. Furthermore, the software or application can be hosted and managed in various ways and/or on various platforms, for example, in the cloud as a service (SaaS), locally on a LAN ("local area network") or within an organization's WAN ("wide area network").

Figure 2:
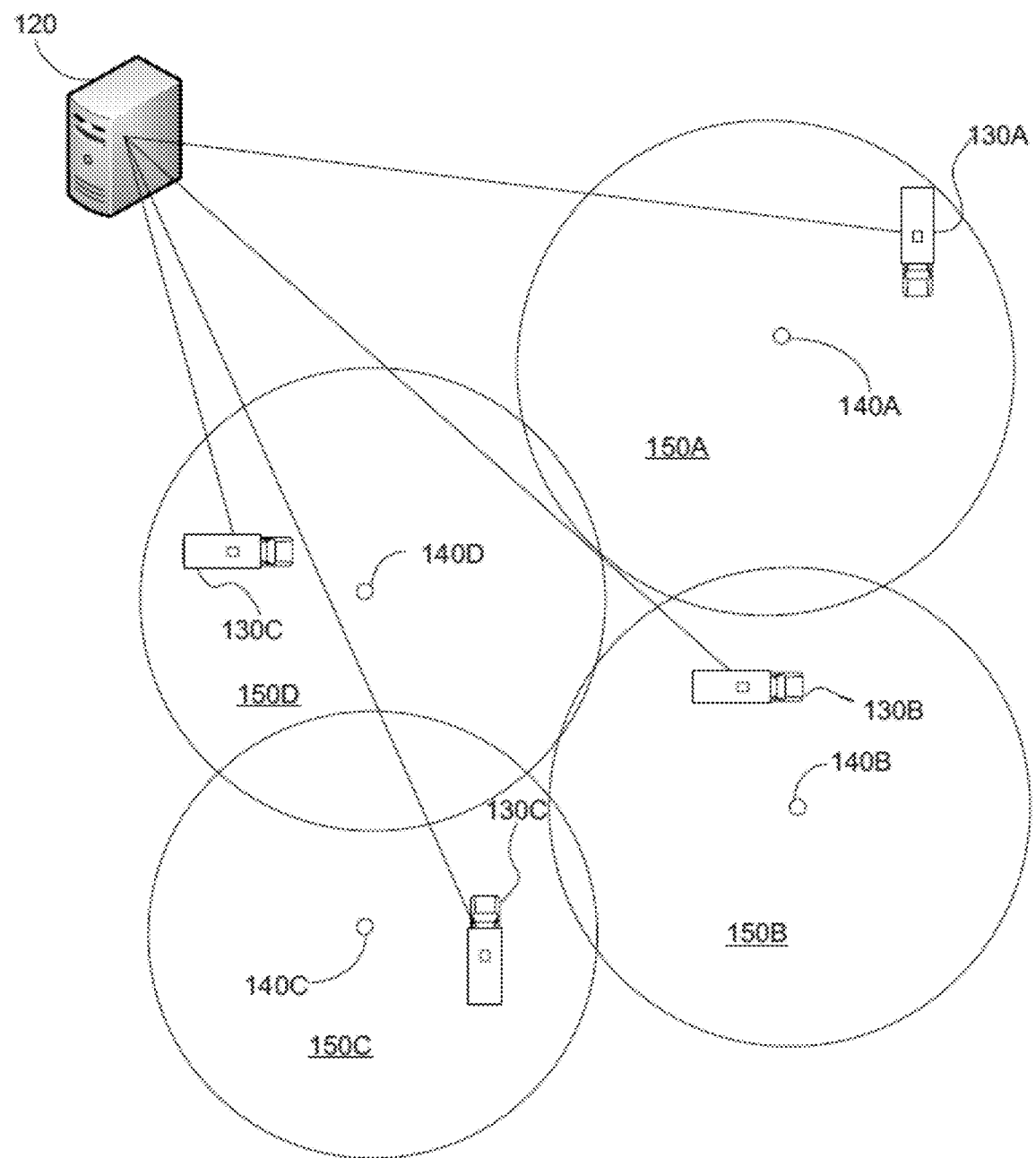
FIG. 2 is a diagram showing inventory storage locations and vehicles in the inventory management system.
Figure 10:
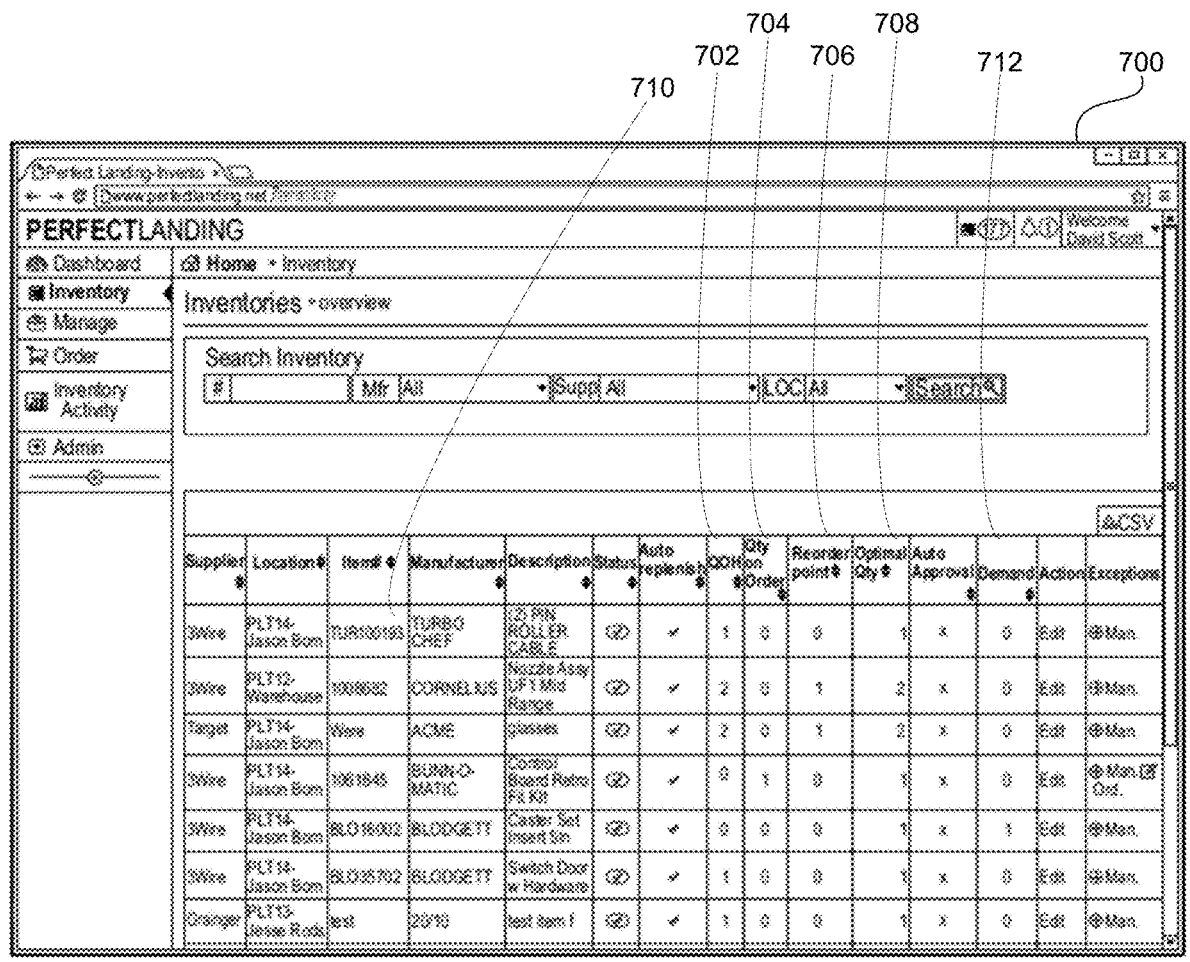
FIG. 10 is an inventory overview display of the inventory management system.

As show in FIG. 2, a plurality of home base or remote locations 140A-D and service vehicles 130A-D contain various inventory items used to service or repair customer equipment. Each distinct type of service inventory item has a unique identifier, for example a part number represented by a bar code, qr code or the like. (Exemplary item identifiers 710 are shown in FIG. 10) Each service vehicle 130 contains one or more computer devices 120 capable of scanning the unique identifier using one of the input devices 116.

Each service vehicle 130A-D has a corresponding home base 140A-D associated with the vehicle, which is a static location. The home base may also be an inventory storage location. Each home base has a geographic identifier, such as GPS coordinates, an address or longitude and latitude coordinates. The geographic identifier may also include other unique identifiers. For example, in an embodiment in which inventory is stored in multiple different storage rooms within a storage location, the code may contain an identifier identifying the storage room in which the inventory is located. Each home base 140A-D has a geographic zone 150A-D or geozone surrounding it within which the service vehicle attends service calls. The geozone may be an area within a certain radius of the home base 140.

In certain embodiments, the center of the geozone may be located at the service vehicle 130. In such embodiments, the geozone associated with the service vehicle will move when the respective vehicle 130 moves.

The central controller 120 contains a central database 128 (shown in FIG. 1), which stores the quantity of each inventory item at each service vehicle 130 and each storage location. The central database 128 is preferably a relational database but could also be a NoSQL database, although other types of database architectures may be used without departing from the principles described in this disclosure. For example, central database 128 may be a SQL database, an Access database or an Oracle database, and in any such embodiment have the functionality stored herein. The central database 128 is updated to reflect the current quantities of each inventory item on each vehicle 130 and at each storage location through communications from the computer devices 110. Preferably, as the inventory items are used or removed from the vehicle 130 or storage location, the inventory items are scanned out. Scanning an inventory item out may reflect that the inventory item has been permanently removed from the inventory or that it has been temporarily removed from the inventory in the case of equipment that is removed from inventory temporarily and later returned. In certain embodiments, the user may manually adjust the database to reflect the current inventory levels. In certain embodiments, an inventory audit of the inventory of a vehicle or storage location may be performed and that audit may be used to update the central database 128. The central database 128 also contains the geographic location information corresponding to the home bases 140 for each vehicle 130 and storage location.

Figure 3:
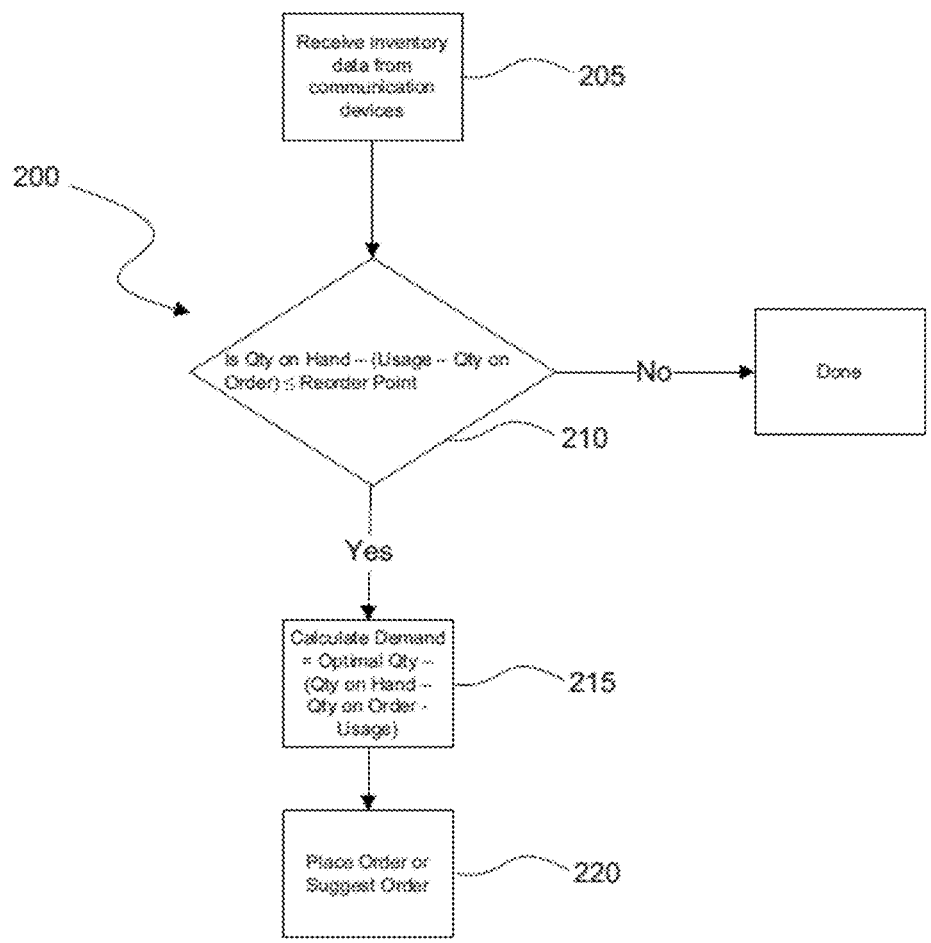
FIG. 3 is a flow chart showing one embodiment of a method of determining whether to order inventory items and order quantity using the system.

As shown in FIG. 3, in one method 200 performed by one embodiment of the system 100, the system 100 monitors inventory levels to detect when inventory levels fall below a reorder threshold and automatically orders or suggests a reorder of inventory items that have fallen below the reorder threshold. In one embodiment, the reorder threshold may be manually set by an administrator. In another embodiment, the reorder threshold may be automatically determined by the usage rate associated with the inventory item based on historic usage data collected by the system. In yet another embodiment, the reorder threshold may be manually set by an administrator, but the system may suggest to the administrator a reorder threshold based on collected historic usage data. The optimal quantity of inventory for the inventory item may similarly be set manually by an administrator, automatically by the system based on usage rate, or suggested by the system and set by the administrator.

FIG. 10 shows an exemplary inventory overview display 700 of the system for monitoring and reviewing levels of inventory items. The inventory overview display 700 shows information regarding the inventory and inventory management settings. For example, for each inventory item, identified by an inventory identifier 710, the inventory overview display 700 identifies the quantity of the inventory item on hand 702, the quantity of the inventory item on order 704, the reorder point 706 and the optimal quantity 708 for the inventory item. The inventory display overview display 700 also shows the demand 712, which can be calculated as described in detail below.

Figure 8:
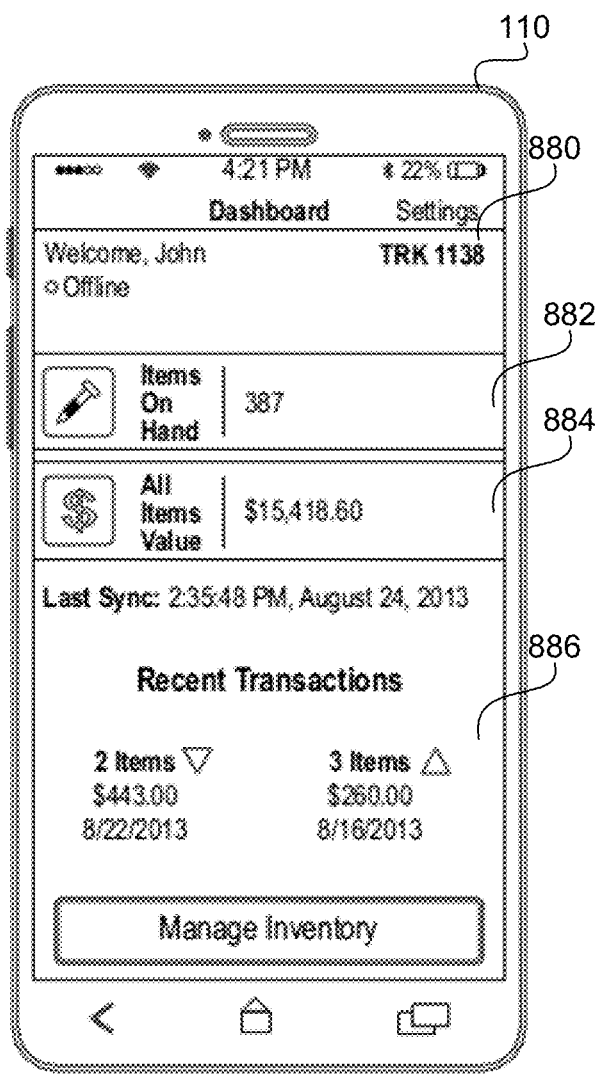
FIG. 8 is a communication device of the inventory management system displaying an inventory overview display.

An inventory overview display 850 for a handheld mobile computer device 110 is shown in FIG. 8. For each inventory item, the inventory overview display shows the inventory identifier 710 and the quantity on hand 702. The inventory overview display 850 for a handheld mobile computer device 110 also displays a graphic representation of the inventory item 852 to help the user identify the desired inventory item. The inventory overview display 850 also identifies out of stock items as red, as shown in FIG. 8, to provide a quick visual identification of out of stock items.

Figure 9:
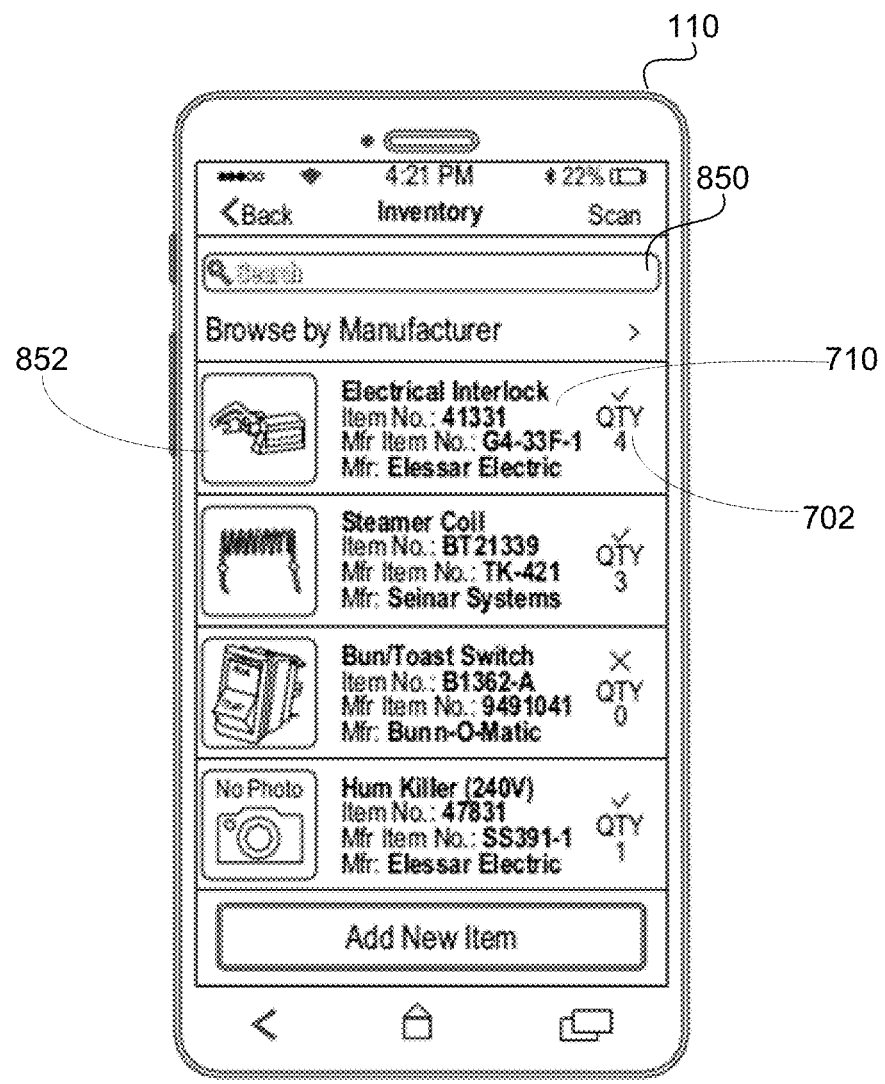
FIG. 9 is a communication device of the inventory management system displaying a vehicle/location level inventory overview display.

FIG. 9 shows a vehicle/location level inventory overview 880 on a handheld mobile computer device 110. The vehicle/location level inventory overview 880 displays the number of items on hand 882 and the value of all of the items on hand 884 for the vehicle inventory associated with the selected vehicle or location. Vehicle/location level inventory overview 880 also displays certain information 886 regarding recent transactions for the inventory of the selected vehicle or location.

The optimal quantity of the inventory items is determined based upon usage frequency for the inventory item and value of the item. In certain embodiments, the optimal quantity is also determined based upon the number of pieces of equipment in the geographic area that require the inventory item.

If the inventory item falls below the reorder threshold, the system can be configured by the administrator to replenish the inventory of the item in one of three different ways. In a first replenishment setting, the system can automatically generate and place an order to replenish the inventory item if it falls below the reorder threshold. In one embodiment, the system may generate the purchase order; while in other embodiments, the system may interface with a pre-existing purchase order system to generate the order. In a second replenishment setting, the system can automatically generate an order to replenish the inventory, and forward the order to a user for approval prior to placing the order. In a third replenishment setting, the system can generate a suggestion sent to the user suggesting that the user generate and place an order for the inventory item. In certain embodiments, the system is connected to order tracking software that provides the current location and estimated delivery timing for pending orders. Thus the system provides users with real time information about pending orders.

As shown in FIG. 3, after the system receives data regarding the inventory information 205, which may include current quantity on hand at a particular storage location, and quantity in use at a particular vehicle, whether the inventory item has fallen below a reorder threshold is determined by assessing whether the quantity of the inventory item on hand at a certain location less the difference between the quantity in use at the location and the quantity of the inventory item that has been ordered for that location is lower than the reorder threshold 210. If the system determines that the inventory item should be reordered, the order quantity is then determined by subtracting the quantity on hand less the sum of the quantity of the inventory item already ordered and in usage from the optimal quantity 215. In this embodiment, whether to reorder the inventory item, and if so what quantity to reorder, is evaluated via the following if/then algorithm:

IF QTY ON HAND−(USAGE−QTY ON ORDER)
≤REORDER POINT

```
THEN DEMAND=OPTIMAL QTY−(QTY ON
    HAND−QTY ON ORDER−USAGE)

ELSE DONE
```

Then, the system either places an order for the demand quantity or suggests to a user that an order for the demand quantity should be placed 220, depending on whether the system is configured to automatically reorder, or to suggest reordering.

Figure 4:
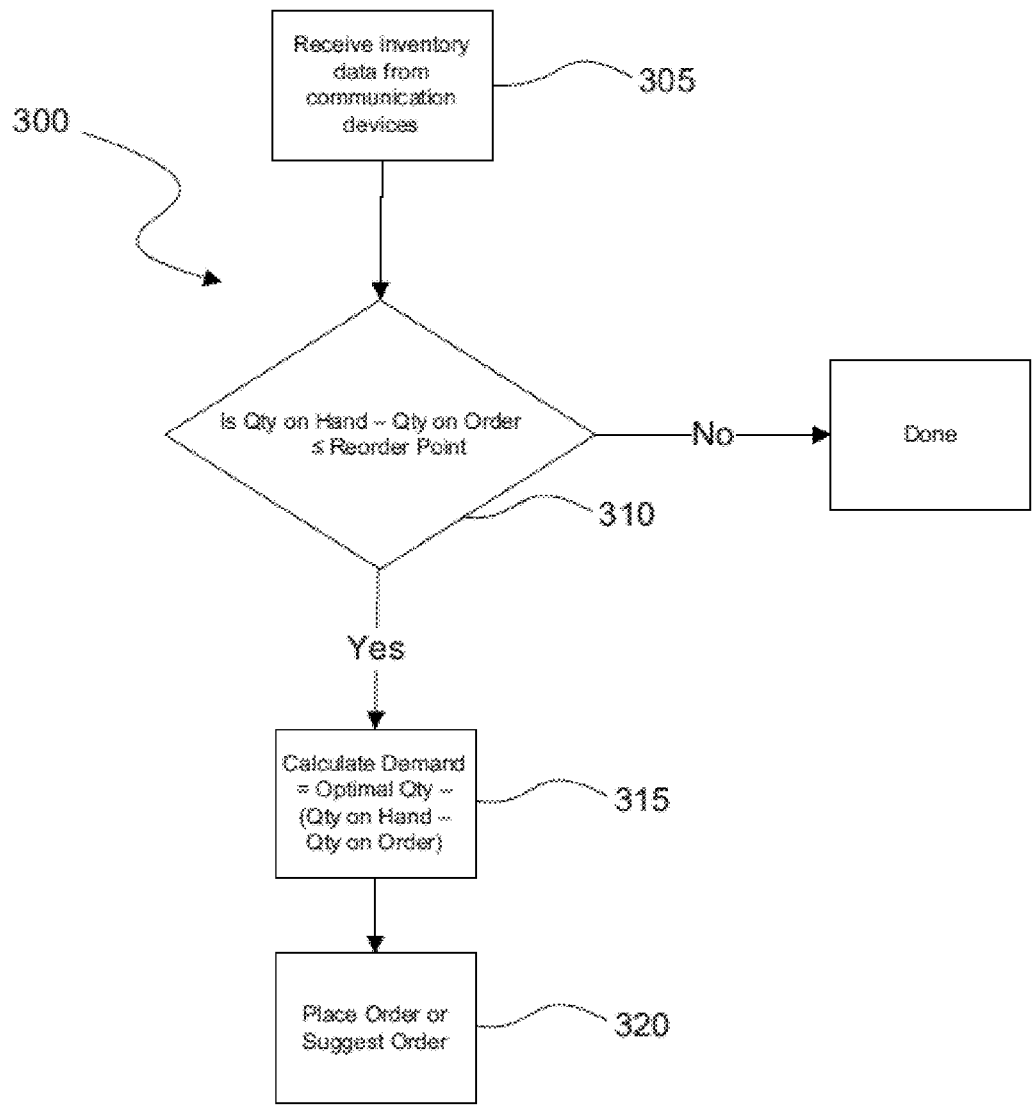
FIG. 4 is a flow chart showing another embodiment of a method of determining whether to order inventory items and the order quantity using the system.

As shown in FIG. 4, in an alternative embodiment 300, after inventory information has been obtained 305, the decision to reorder can be made by the system by assessing whether the quantity on hand at a particular location less the quantity ordered at the location is less than the reorder threshold 310. Similarly, in this embodiment, the ordered quantity is the difference between the optimal quantity of the inventory item less the quantity of the inventory item already ordered 315. This simpler reorder threshold can be evaluated via the following if/then algorithm.

```
IF QTY ON HAND−QTY ON ORDER≤REORDER
    POINT

THEN DEMAND=OPTIMAL QTY−(QTY ON
    HAND−QTY ON ORDER)

ELSE DONE
```

As in the previous embodiment, the system either places an order for the demand quantity or suggests to a user that an order for the demand quantity should be placed 320, depending on whether the system is configured to automatically reorder, or to suggest reordering.

Figure 11:
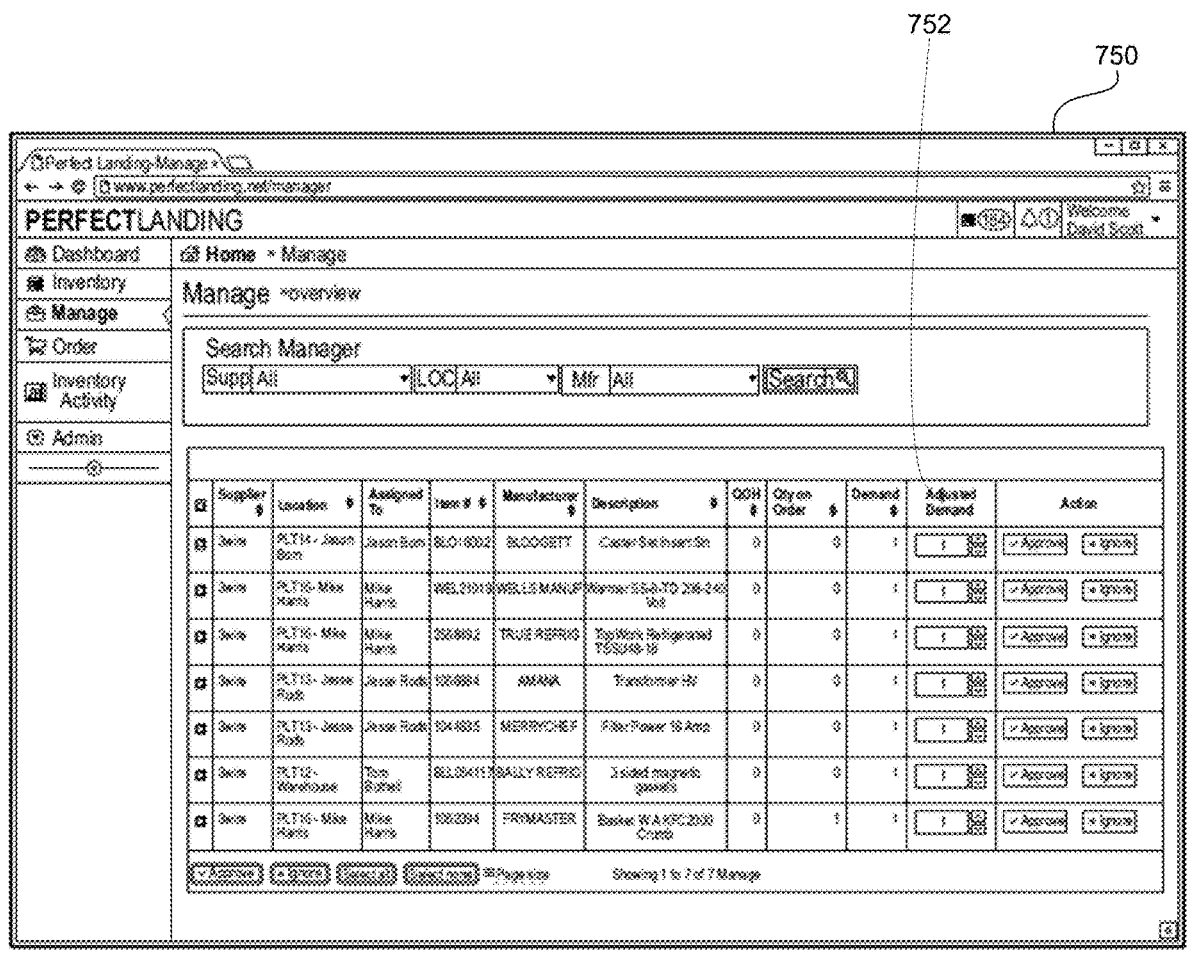
FIG. 11 is an inventory management display of the inventory management system.

FIG. 11 shows an inventory management display 750 for the inventory management system. The inventory management display 750 permits a user to manually adjust the calculated demand by entering an adjusted demand via a demand adjustment field 752.

Figure 12:
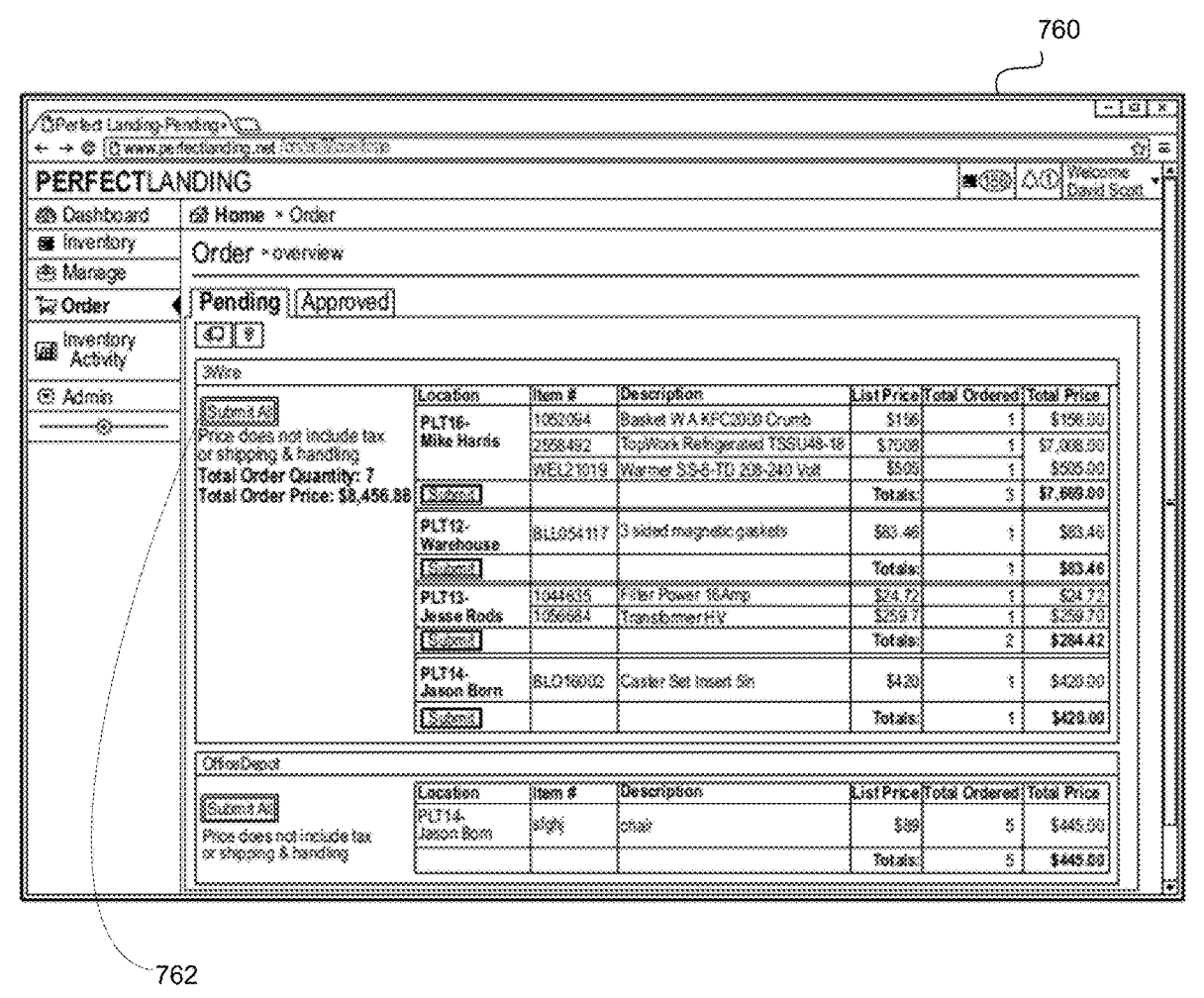

The status of the recommended orders is displayed by an order overview display 760, shown in FIG. 12. In embodiments requiring preapproval prior to submission of an order, as shown in FIG. 12, the system requires authorization of the order by a user. For example, as shown in FIG. 12, a user must input approval of the order via the "submit all" button 762.

When an order has been placed, inventory items are sent to the location from which the order was placed or another designated receiving location. The order is received at the receiving location, the inventory is stocked into an inventory storage location or onto a service vehicle 130 and the database is updated to reflect the addition of the inventory to the storage location or the vehicle 130. Similarly, when a repair part or inventory item is used during a service call, thereby depleting the number of that part on the vehicle 130, the database is updated to reflect the depletion of inventory. The updating of inventory can be done manually. However, in a preferred embodiment, the updating is done automatically. In one such automatic embodiment, when an item is removed from or received at a storage location or a vehicle or an item is depleted through use, the item is scanned by the mobile computer device 110. The scanned item is identified by the user as removed, received or used, depending on the disposition of the item, and, the database 128 is updated accordingly.

In another aspect, the mobile connected computer devices 110 have an offline mode so that they can continue to operate even if communication with the central controller is unavailable. During offline mode operation, updates to the database will be stored on the local mobile connected computer and transmitted to the central controller and database 128 when communication has been restored. The offline mode also allows a user to access a database of inventory items stored locally on the mobile computer device 110, which is a copy of the central database 120 prior to the loss of communication.

The system also links the use of an inventory item to a particular event, such as but not limited to a service call, work order, item transfer or shrinkage. Specifically, when an item is identified by a user as having been used, the user may enter via the computer input devices a command to associate the use of the inventory item with a certain service call, thereby creating or modifying a service call report. The service call report may contain certain information, including a unique service call number and/or by a customer name, code or number and a date and time, as well as the inventory item used on the service call. The service call report may also include the time spent on the service call as well as the distance traveled to the service call. The system may also automatically attach the location of the use of the inventory item to the service call report.

Figure 7:
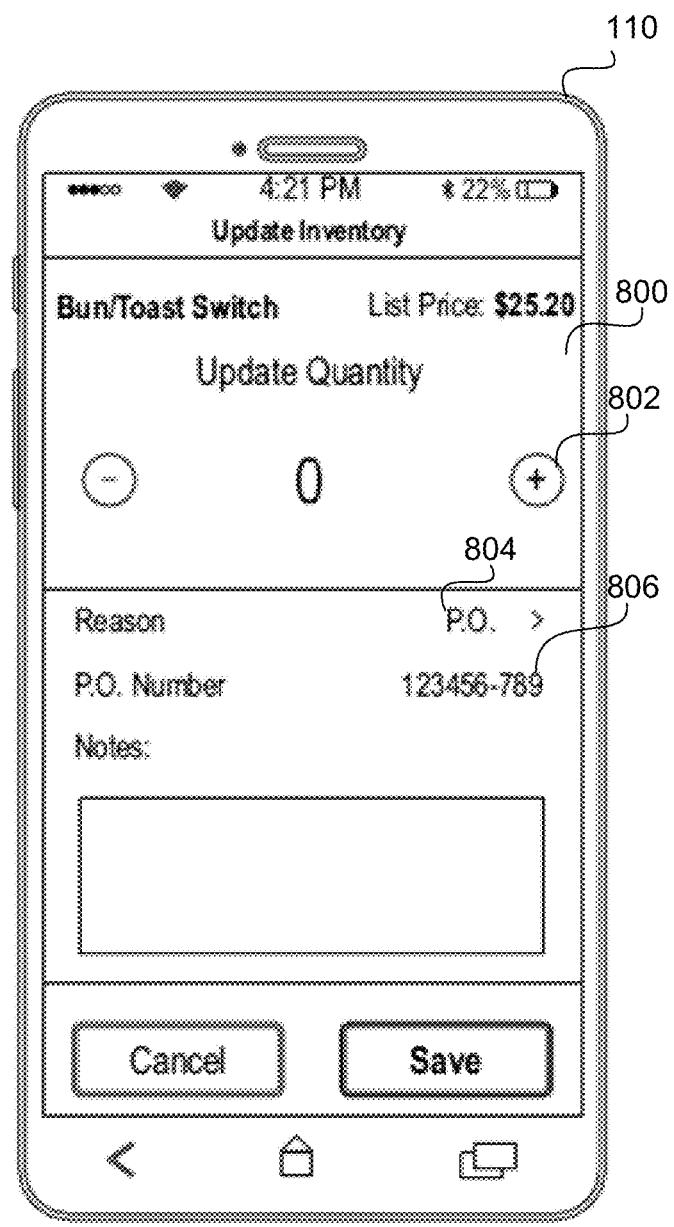
FIG. 7 is a communication device of the inventory management system displaying an inventory management display.

FIG. 7 shows an inventory management display 800 on a handheld mobile computer device 110. The inventory management display 800 allows a user to input information regarding an event that requires an adjustment to the inventory, e.g. consumption of inventory via a service call or addition of inventory via receipt of an order. Touch screen buttons 802 allow the user to add or subtract the quantity of inventory item affected by the event. A "reason" field 804 allows a user to input a reason for the inventory adjustment. The reason may be selected from a predetermined reason list, or in certain embodiments may allow a free form text entry. Certain reason codes may be prompt the user to provide additional information. For example, as shown in FIG. 7, where the user has input the reason as purchase order ("P.O.") the system prompts the user to input a purchase order number 806 associated with the purchase order.

Figure 13:
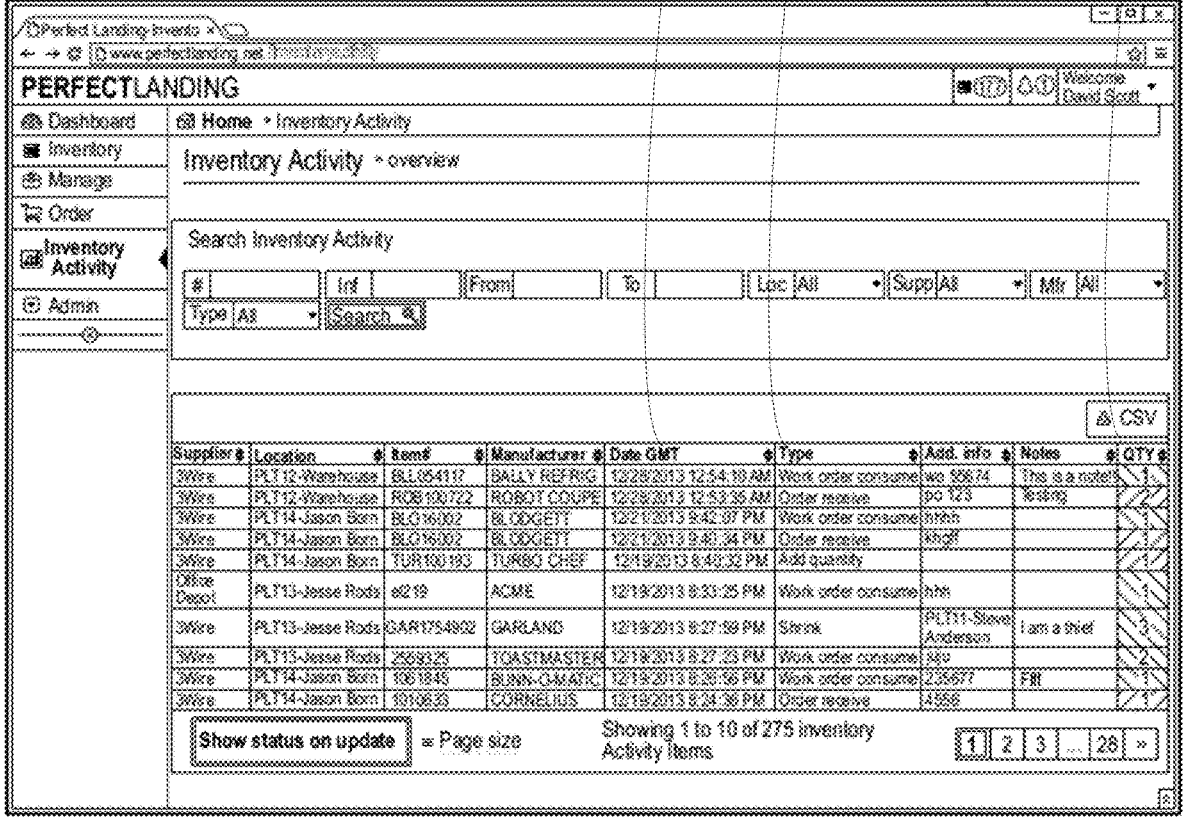
FIG. 13 is an inventory activity display of the inventory management system.

An exemplary inventory activity display 770 displaying the recent inventory events and information relating to those events is shown in FIG. 13. As shown in FIG. 13, for each event, the inventory activity screen displays the date of the event 772, the type of event 774 and the quantity of the inventory item involved in the event 776. The quantity of the inventory item involved in the event is color coded so that reductions in inventory, such as consumption of an inventory item during a service call, are coded red and additions to inventory, such as orders, are color coded green.

The information from the service call report is used to automatically generate an invoice for the service call. A known invoice generation application such as PeopleSoft Basware Invoice Automation, SAP Invoice Management and/or similar applications provided by Oracle, Microsoft Dynamics, are used to generate the invoice. Such invoice generation applications retrieve data from the system 100 and incorporate the retrieved data into invoices.

Certain equipment that is serviced has either a unique serial number or other identifier known in the art, such as a QR code or bar code. Alternatively, the equipment may have an identifier of the type of equipment, but not a unique equipment identifier. In either case, the unique equipment identifier or the equipment type identifier may be entered into the connected computer, either manually or via a reader or scanner, as previously described. That identifier is attached to the service call report, which identifies the transaction in which the item was used.

In another aspect, inventory items are optionally identified as shared inventory items. Shared inventory items are items that may be shared by and used in more than one geographic zone or geozone. For example, in FIG. 2, a shared inventory item may be shared between geozones 150B, 150C and 150D. A user may manually designate an item as a shared item. Typically inventory items that are high-cost, low usage/turnover, or large in size, and/or items that have some combination of these attributes, e.g. low turnover and high cost, are likely to be identified as shared items.

Figure 5:
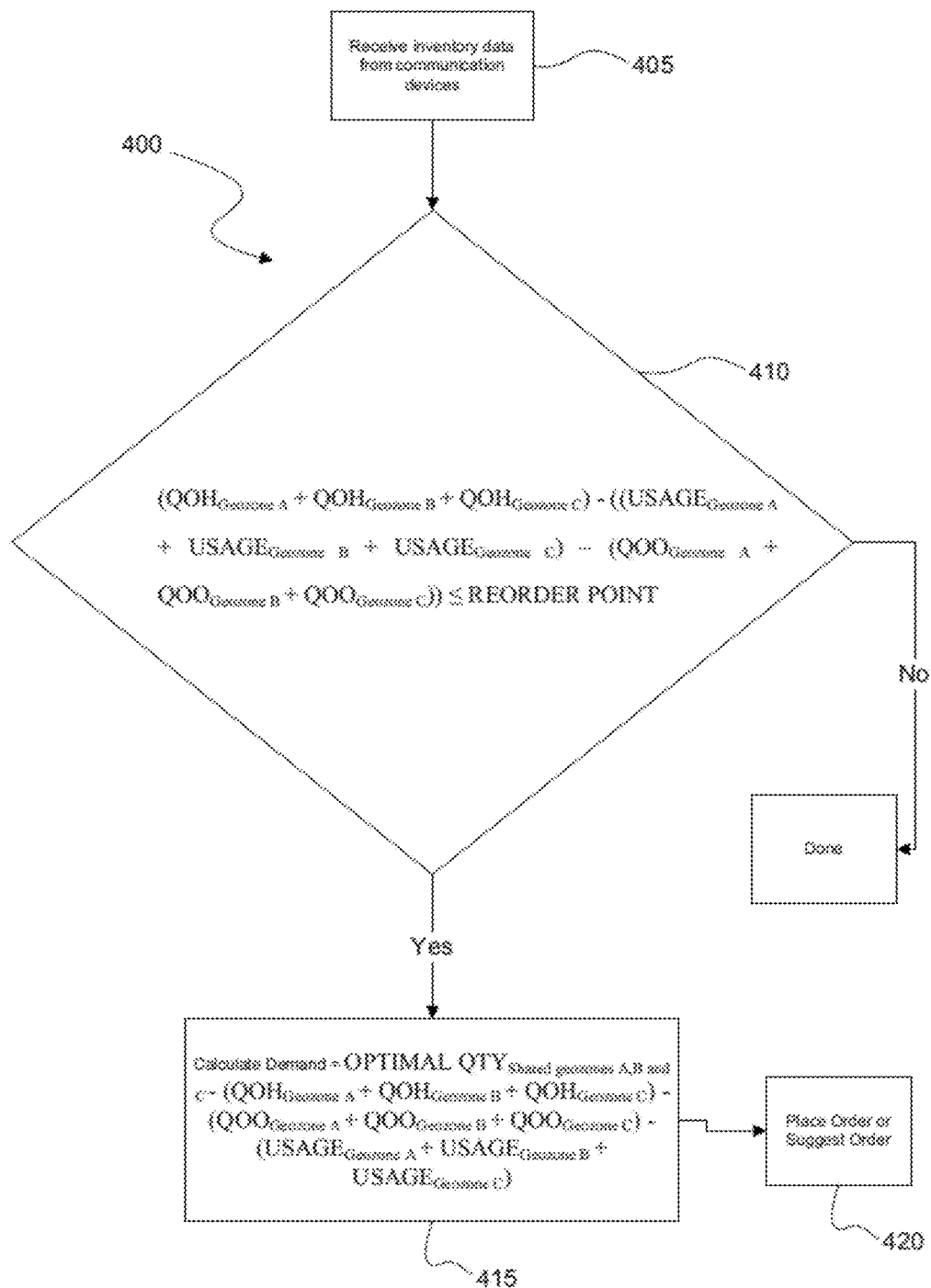
FIG. 5 is a flow chart showing an embodiment of a method of determining whether to order shared inventory and order quantity using the system.

As shown in FIG. 5, in one aspect of the system, the method of replenishment of shared inventory items 400 may be managed by the system in a different manner than standard inventory items. Specifically, inventory data is collected from each of the mobile computer devices 110 within the shared geozone 405. Then, the decision whether to order or suggest ordering a shared inventory item is based on whether the total of the inventory items in each of the shared geozones associated with the inventory item is below the minimum threshold 410. Similarly, the determination of the quantity to order is based on the quantity of the inventory item on hand, quantity of inventory item on order and quantity of the inventory item in use in for the shared geozones 415. For example, for an inventory item shared across shared geozones A, B and C, the following algorithm would apply:

IF (QTY ON HAND$_{Geozone\ A}$+QTY ON HAND$_{Geozone\ B}$+QTY ON HAND$_{Geozone\ C}$)−((USAGE$_{Geozone\ A}$+USAGE$_{Geozone\ B}$+USAGE$_{Geozone\ C}$)−(QTY ON ORDER$_{Geozone\ A}$+QTY ON ORDER$_{Geozone\ B}$+QTY ON ORDER$_{Geozone\ C}$))≤REORDER POINT THEN DEMAND=OPTIMAL QTY$_{Shared\ geozones\ A,\ B\ and\ C}$−(QTY ON HAND$_{Geozone\ A}$+QTY ON HAND$_{Geozone\ B}$+QTY ON HAND$_{Geozone\ C}$)−(QTY ON ORDER$_{Geozone\ A}$+QTY ON ORDER$_{Geozone\ B}$+QTY ON ORDER$_{Geozone\ C}$)−(USAGE$_{Geozone\ A}$+USAGE$_{Geozone\ B}$+USAGE$_{Geozone\ C}$)

ELSE DONE

As with the methods for managing non-shared inventory items, the system either places an order for the demand quantity or suggests to a user that an order for the demand quantity should be placed 420, depending on whether the system is configured to automatically reorder, or to suggest reordering.

Allocation of ordered inventory items for shared items may be managed in the ways described below. In one embodiment, the ordered inventory to be shared across a shared geozone may be allocated to one of the individual geozones based on either frequency. For example, if geozone A has a much higher usage rate for the inventory item than geozones B and C do, across a shared geozone comprised of geozones A and B, and only a single inventory item has been ordered, that ordered item will be allocated to geozone A. Alternatively, if a more than one of the inventory item is ordered, the ordered inventory items are allocated proportionally to geozones A, B and C based on present inventory levels and prior usage rates. In another embodiment, the ordered inventory item may be allocated to the geozone within a shared geozone that is geographically most accessible to the other geozones.

Figure 6:
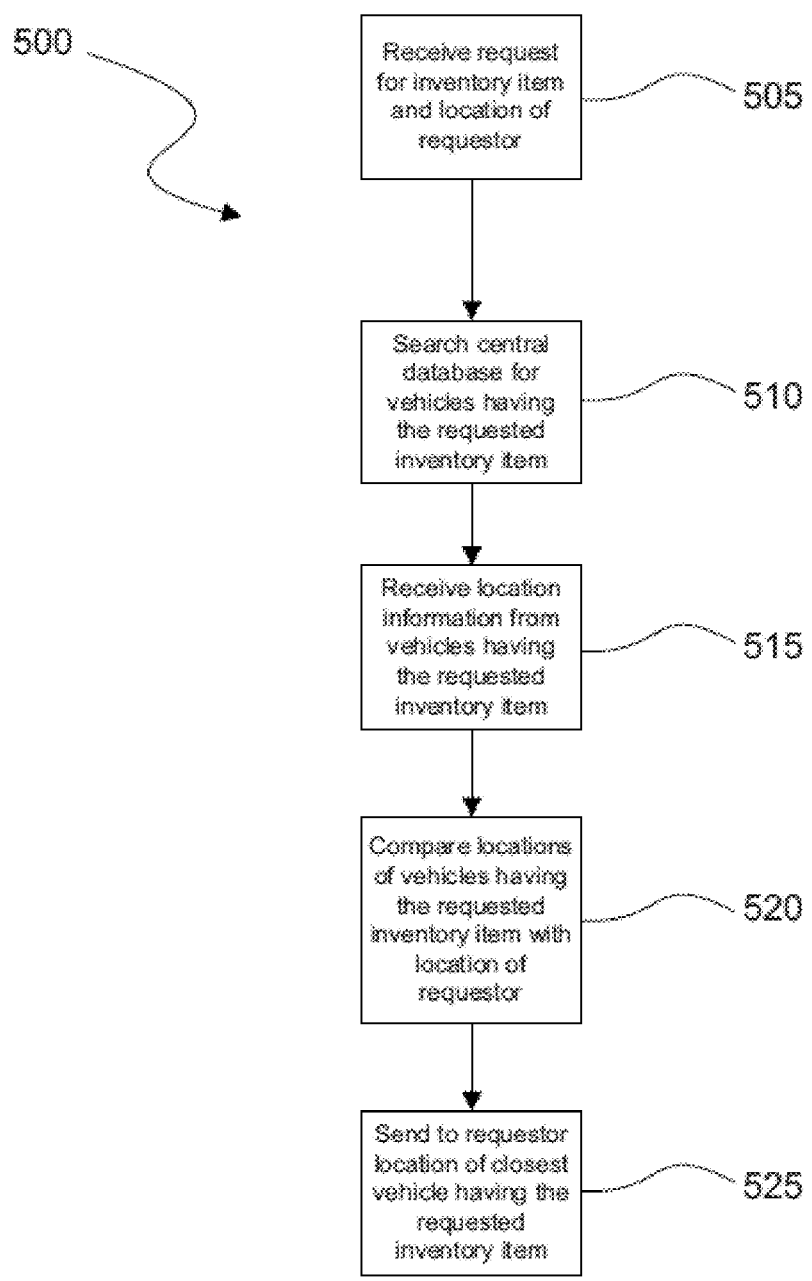
FIG. 6 is a flow chart showing an embodiment of a method of identifying the closest inventory item.

As shown in FIG. 6, in another aspect of the system users are able to use the system to identify the closest location of a shared inventory item 500. An operator who has a need for a certain inventory item, which the operator does not have in stock, can use the communication device 110 to send a query to the central database 128 to identify the closest location of the inventory item 505, which may be either in a vehicle 130 or at a storage location. The central controller 120 identifies from the central database 128 the vehicles 130 and/or storage locations that have the needed item 510. The central controller 120 receives location information, for example a GPS position, from the dispersed communication devices 515. The central controller then ranks those vehicles and storage locations according to how close they are to the requesting communication device 520 and transmits to the requestor the closest or multiple closest vehicles and/or storage locations that have the desired inventory item 525. The system further allows the requesting communication device to communicate with the communication device associated with the vehicle and/or storage location that has the desired item in stock so that the requesting operator can coordinate pick-up or delivery of the desired inventory item with the operator of the vehicle or an attendant of the storage location with the desired item. The item that is transferred is removed from—for example by being scanned out—the inventory of the responding location and added to the inventory of the requesting location, according to the methods described herein.

In another embodiment, the system provides an overview of all of the locations of a certain identified inventory item. For example, a user may request that the system identify the location of all vehicles and/or storage locations containing a certain inventory item. The central database identifies the vehicles and/or storage locations that have the needed item and identifies the geographic location of the vehicles that have the desired device. The system then provides that information to the user via a user display. The display may be a map of the locations of the vehicles and/or storage locations that have the item, or a textual identification of geographic locations of those vehicles and/or storage locations or a combination of the two.

Geozones that are shared can cross over organizational or company lines. A system displaying available inventory which is closest (in distance) to a requesting user may display inventory that is shared between service companies. For example, if service company A needs a part that is not in stock in any of their vehicles or vehicles, a user from service company A may use the system to search for inventory of the desired item from companies participating in inventory sharing using the system. The system allows for Service Company A to contact Service Company B and facilitate a potential transaction. In certain embodiments, the system may charge a fee for facilitating this transaction.

In certain embodiments, the system may automatically establish shared geozones and/or suggest shared geozones for certain inventory items. In such embodiments, an administrator will input a maximum travel distance that a vehicle may travel to retrieve a shared inventory item. The system will then compare the distance between points in the geozones associated with each of the home bases to determine which geozones may be grouped together to form a shared geozone. The system will also balance the shared geozones to smooth usage across the various shared geozones. For example, if geozone D falls within the minimum travel distance of geozone E and geozone F, the system will compare the rate of usage of the inventory item for geozone E and geozone F to determine which has a lower usage rate. The system will then assign geozone D to whichever of the compared geozones has the lower usage rate.

The system also provides service provision data reporting. For example, in response to a request by a system administrator, the system can aggregate data regarding service calls and provide comprehensive reporting about such service calls. The service provision data reporting can provide reports grouped by geographic area, by service provider, by average time or average bill, and/or by type of service item used. Where equipment has a unique identifier, the service provision data reporting can also generate a report of the frequency and types of service performed on the equipment.

The system can also identify when a certain part was installed on a certain piece of equipment. For example, a user can access the database of service calls for a specific piece of equipment to identify the date when a certain part was last installed on that piece equipment. This information can be used to evaluate and track the average life of an inventory item after it has been installed on the equipment. Furthermore, the system can identify when the item was installed on the equipment to determine whether the item is still under warranty. Such reporting can be used to track and report on service performance and warranty issues across a broad customer base. This part-life history can be used to develop preventative maintenance schedules wherein the system notifies the customer or a service provider when a part is nearing its anticipated end of life. Furthermore, the aggregation and reporting of equipment information may be used by equipment sellers or equipment service providers to drive sales of new equipment or service contracts.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A central computing device for communicating with remote computing devices within an inventory system having a plurality of home bases and service vehicles as inventory units, each inventory unit having a remote computing device, comprising:
   a database configured to store inventory information corresponding to inventory units within the inventory system comprising geo-zones corresponding to each of the home bases, and a quantity of each inventory item at the inventory units;
   a memory configured to store a reorder criteria, wherein the reorder criteria identifies a reorder threshold quantity for a selected shared inventory item;
   a communication device comprising a web server configured to receive inventory update information from a remote computing device of an inventory unit; and
   a processor in communication with the database, memory, and communication device, and that receives a maximum travel distance for service vehicle, wherein the processor is structured to perform operations to:
      for a shared inventory item, determine a shared geo-zone for the selected based upon the geo-zones comprising each of the home bases and the maximum travel distance for each service vehicle, wherein the shared geo-zone geographically shifts according to a current location of each service vehicle;
      determine a shared inventory quantity of the shared inventory item within the shared geo-zone, comprising:
         causing the web server to receive, from at least one remote computing device within the shared geo-zone, the inventory update information for the shared inventory item, the information comprising a scanned QR code; and
         determining a storage location of the shared inventory item, the storage location being encoded in the scanned QR code;
      compare the shared inventory quantity within the shared geo-zone to the reorder criteria;
      determine whether the inventory information satisfies the reorder criteria based on the comparison;
      in response to determining the inventory information satisfies the reorder criteria, implement a reorder protocol for a reorder quantity of the shared inventory item; and
      allocate the reorder quantity between geo-zones of the shared geo-zone based at least on determining a relative shared inventory item usage rate within each shared geo-zone.

2. The central computing device of claim 1, wherein the processor implements the reorder protocol to reorder the selected shared inventory item proportionally amongst the inventory units within the shared geo-zone based on present inventory levels and prior usage rates.

3. The central computing device of claim 1, wherein the reorder threshold quantity for the selected shared inventory item is defined to maintain a threshold quantity of the selected shared inventory item among the inventory units within the shared geo-zone.

4. The central computing device of claim 1, wherein the selected shared inventory item corresponds to at least one of a high-cost inventory item, a low usage or low turnover inventory item, or a large sized inventory item.

5. The central computing device of claim 1, wherein the inventory update information is generated by the remote computing device during an offline mode.

6. The central computing device of claim 1, wherein the geo-zones corresponding to the services vehicles are non-static.

7. The central computing device of claim 6, wherein the geo-zones corresponding to the services vehicles are defined by a predetermined radius surrounding each of the service vehicles.

8. The central computing device of claim 1, wherein one of the inventory units stores a first shared inventory item and a second inventory item, and wherein the shared geo-zone for the first shared inventory item is different than the shared geo-zone for the second shared inventory item.

9. The central computing device of claim 1, wherein the processor is configured to implement the reorder protocol to reorder the selected shared inventory item to be stored at the inventory unit having the highest usage among the inventory units having geo-zones within the shared geo-zone.

10. The central computing device of claim 1, wherein the processor is configured to implement the reorder protocol to reorder the selected shared inventory item to be stored at the inventory unit having that is geographically most accessible to the other inventory units having geo-zones within the shared geo-zone.

11. The central computing device of claim 1, wherein the processor is further configured to identify a closest of the inventory units within one of the shared geo-zones having a particular shared inventory part.

12. The central computing device of claim 1, wherein the geo-zone of at least one of the inventory units is defined to be included within at least two of the shared geo-zones.

13. The central computing device of claim 1, wherein the shared geo-zones are defined based on a maximum travel distance between the geo-zones within that shared geo-zone.

14. The central computing device of claim 1, wherein the processor is further configured to balance usage across the shared geo-zones, wherein one of the inventory units meeting criteria to be defined within multiple shared geo-zones is assigned to the shared geo-zone within the multiple shared geo-zones having the lower rate of usage.

15. The central computing device of claim 1, wherein the QR code further comprises a unique part identifier different from a manufacturer's part identifier, and wherein the processor is structured to make determinations regarding the shared inventory item based on the unique part identifier.

16. An inventory system comprising:
- a plurality of home bases, each having an associated remote computing device, a geo-zone defined about each of the home bases;
- a plurality of service vehicles, each having an associated remote computing device and operating within the geo-zone defined about one of the home bases; and
- a central computing device for communicating with the remote computing devices associated with the plurality of home bases and plurality of service vehicles, the central computing device comprising:
  - a database configured to store inventory information corresponding to inventory units within the inventory system, the inventory information comprising the geo-zones defined about each of the home bases, and a quantity of each inventory item at the home bases and the service vehicles;
  - a memory configured to store a reorder criteria, wherein the reorder criteria identifies a reorder threshold quantity for a selected inventory item;
  - a communication device comprising a web server configured to receive inventory update information from the remote computing device; and
  - a processor in communication with the database, memory, and communication device that:
    - receives a maximum travel distance for each service vehicle;
    - for a shared inventory item, determines a shared geo-zone based upon the geo-zones comprising each of the home bases and the maximum travel distance for each service vehicle, wherein the shared geo-zone geographically shifts according to a current location of each service vehicle;
    - determines a shared inventory quantity of the shared inventory item within the shared geo-zone, comprising:
      - causing the web server to receive, from at least one remote computing device within the shared geo-zone, the inventory update information for the shared inventory item, the information comprising a scanned QR code; and
      - determining a storage location of the shared inventory item, the storage location being encoded in the scanned QR code;
    - compares the shared inventory quantity within the shared geo-zone to the reorder criteria;
    - determines whether the inventory information satisfies the reorder criteria based on the comparison;
    - in response to determining the inventory information satisfies the reorder criteria, implement a reorder protocol for a reorder quantity of the shared inventory item; and
    - allocate the reorder quantity between geo-zones of the shared geo-zone based at least on determining a relative shared inventory item usage rate within each shared geo-zone;
  - wherein the remote computing devices associated with the home bases and service vehicles of the shared geo-zone present the allocation of the reorder quantity to the geo-zones of the determined shared geo-zone.

* * * * *